United States Patent [19]
Janse

[11] 4,022,246
[45] May 10, 1977

[54] DAMPER ASSEMBLY FOR CLOSING A DUCT FOR HOT GASES

[75] Inventor: Casper Janse, Leusden, Netherlands

[73] Assignee: Forney International, Inc., Carrollton, Tex.

[22] Filed: Apr. 21, 1976

[21] Appl. No.: 678,785

[30] Foreign Application Priority Data
Apr. 25, 1975 Netherlands .............. 7504897

[52] U.S. Cl. .................................. 137/601; 98/110
[51] Int. Cl.² .................. F24F 13/14; F23L 13/08
[58] Field of Search .......... 137/601; 98/110, 121 A

[56] References Cited
UNITED STATES PATENTS 3,426,507  2/1969  Kossowski .................. 137/601 X
3,604,458  9/1971  Silvey ............................. 137/601

Primary Examiner—Robert G. Nilson
Attorney, Agent, or Firm—Marvin A. Naigur; John E. Wilson

[57] ABSTRACT

A damper assembly for closing a duct carrying hot gases. The assembly comprises a damper frame mountable in the duct, a plurality of damper blades supported by parallel blade shafts rotatably mounted in the frame, the shafts having shaft ends projecting from the frame at least one side thereof, blade operating arms secured to the projecting blade shaft ends, and linkage means operatively coupling the blade arms to each other and to an actuating device for opening and closing the damper.

8 Claims, 5 Drawing Figures

DAMPER ASSEMBLY FOR CLOSING A DUCT FOR HOT GASES

BACKGROUND OF THE INVENTION

Dampers find application inter alia as a closure member in the flue-gas ducts of large boilers, cement kilns and the like. They are also often used in gas turbine installations for the combined generation of electricity and steam where the damper is placed in the duct carrying the hot exhaust gases from the turbine driving an electric generator to a boiler, so that the boiler can be put out of operation by closing the damper while the gas turbine remains in operation. In this case there is also provided a bypass duct, likewise equipped with a damper, which leads to a chimney.

Dampers of the aforesaid type have relatively large dimensions, for instance, 3 × 2 to 6 × 4 m, while the pressure level against which the damper is to provide a closure may be 300–500 k/m².

When fully open such dampers must create an acceptably low resistance to flow, and in the closed position ensure substantially gas-tight closure with losses through leakage not exceeding a few tenths of a percent of the total gas flow.

In designing such damper assemblies one problem which is encountered is that in operation relatively large temperature differences, and, consequently, differences in thermal expansion often occur between the damper frame and the blade actuating linkage outside the duct. For example, when the damper blades and their shafts are at a temperature of 500° centigrade the temperature of the damper frame may be 300° centigrade and that of the actuating linkage for the damper blades 50° centigrade. In general this linkage comprises a coupling rod, which consists of adjustable parts interconnecting the successive blade arms and connected at one end to the actuating device that may be operated pneumatically, electrically or manually. If the individual parts of the coupling rod are set so that when cold the blade arms of the damper extend parallel to each other, when the damper frame is hot, this parallel setting is lost owing to the differential thermal expansion of the hot damper frame and the relatively cool coupling rod. It follows that if the damper blades are set for a perfectly tight closure under cold conditions, there will in the hot state, be an angular displacement of the damper blades which increases progressively from the damper blade on the frame side nearest to the actuating mechanism to the blade on the opposite frame side. This may give rise to substantial open gaps between the individual damper blades, so that the desired gas-tight closure by the damper can no longer be assured at all temperatures.

Various proposals have already been made for solving this problem. Thus, for example, it has been suggested that the coupling rod should be so designed and arranged that the individual damper blades would be pulled closer together as the damper frame becomes hotter, the blades being given under cold conditions of the frame, such open bias as to sealingly bear against each other precisely at the expected operational temperature. This proposal, however, is problematic inasmuch as the actual temperature difference between the damper frame and the coupling rod is difficult to predict, so that the desired gas-tight sealing in the closed position of the damper is not reliably attainable. Moreover, the temperature of the gases flowing through the duct may vary according to the operational conditons. Another proposed solution envisages arranging resilient elements in the parts of the coupling rod extending between the blade arms. This has the disadvantage, however, that the rigid coupling between the damper blades and actuating device is lost making it uncertain whether the blades will fully close if, for instance, the blade shafts move stiffly in their bearings. Nor does this construction provide any guarantee that when the actuating device is set at a "fully open" position, the damper blades will actually assume the positions in which their resistance to flow is reduced to the lowest possible value.

SUMMARY OF THE INVENTION

The invention has for its object to provide a damper assembly of the indicated kind which effectively solves the above discussed problem by relatively simple means.

The damper assembly according to the invention is essentially characterized in that the linkage means include a plurality of identical ancillary lever means operatively associated with each of said blade arms, respectively, and rotatably supported on lever shafts extending parallel to the blade shafts and mounted on a support member secured outside of said duct, said lever means each having a lever arm of a length equal to the length of the associated blade arm to which it is linked by an operating link, said link having a length such that at least under a given temperature condition of the damper frame said lever arm extends parallel to its associated blade arm, the ancillary lever means being connected to each other in parallel position and to the actuating device by a coupling rod.

With the present arrangement, if the shafts of the ancillary lever means are shifted relatively to the blade shafts when a temperature difference develops between the damper frame and the support member carrying these lever means resulting in a differential expansion of the frame and the support member, the blade arms nevertheless retain at least approximately their parallel position to the lever arms of ancillary lever means and so stay in the originally set angular position. Thus, a closed damper remains tight and a damper in the open state keeps its fully open position, while a preset tension bias between the blades in the closed position is likewise retained.

A small angular displacement could still occur between the several blade arms as a result of the angular movement of the operating links arising from the shifting of the blade shafts caused by the heat expansion of the damper frame. In order to eliminate this minor twist as well, according to the invention there may advantageously be provided a tie link extending between the lever shaft of each ancillary lever means and the associated blade shaft, the length of the tie link being equal to the length of the operating link, said support member being arranged to have a restricted freedom of movement at right angles to the plane of the frame. The lever arm of the ancillary lever means, the operating link, the blade arm and this tie link thus compose a parallelogram, so that in any thermal condition of the damper frame the blade arms always stay parallel to the lever arms.

In order to achieve this restricted mobility of the support member, this member may, according to the invention, advantageously consist of a beam extending at right angles to the blade shafts and rigidly united to the frame in the extension of one of the two frame members lying parallel to the blade shafts and so seated in a guide means formed on the frame in the extension of the opposite frame member as to allow a translatory movement of the beam relatively to the frame and a restricted flexure of the beam at right angles to the plane of the frame.

BRIEF DESCRIPTION OF THE DRAWINGS

The invention will be further explained with reference to an embodiment shown in the drawings, wherein.

DETAILED DESCRIPTION OF THE PREFERRED EMBODIMENT

Figure 3:
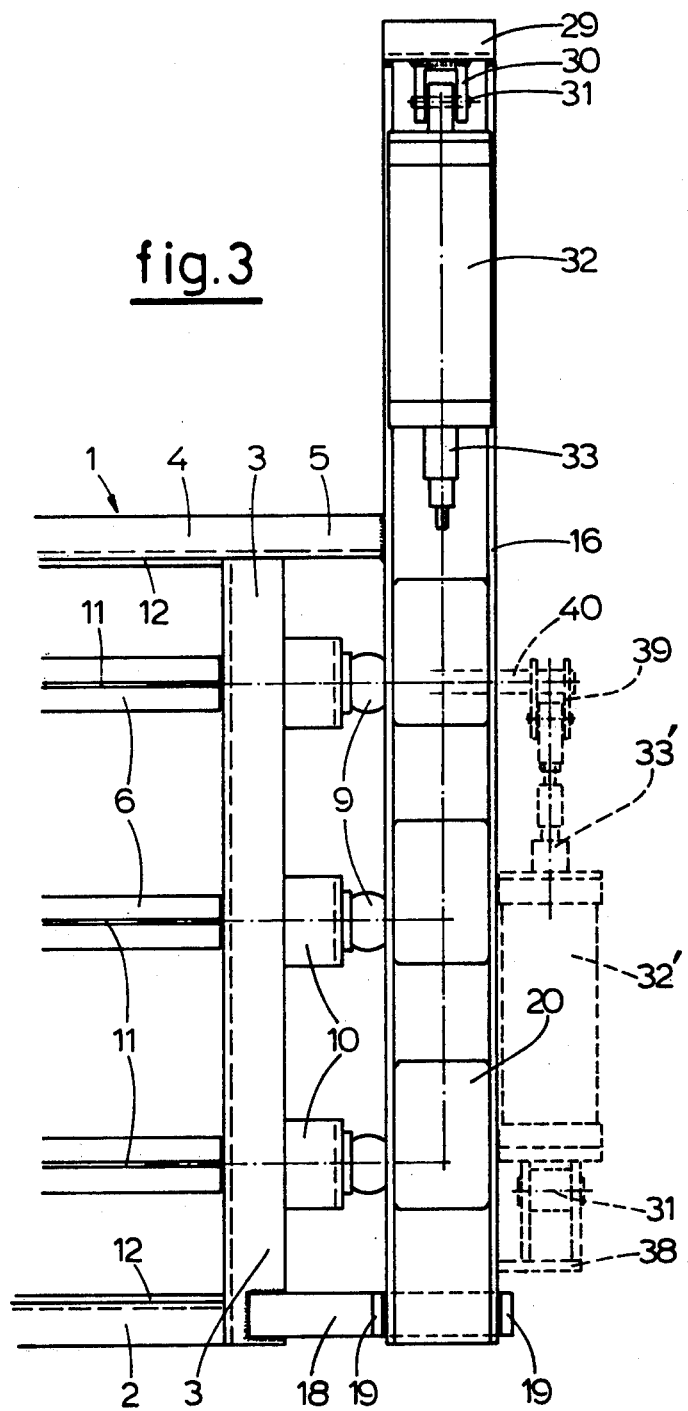
FIG. 3 shows a front elevation of a portion of a preferred embodiment of the damper assembly according to the invention, the linkage for actuating the damper blades having been omitted and the blades occupying the open position.
Figure 4:
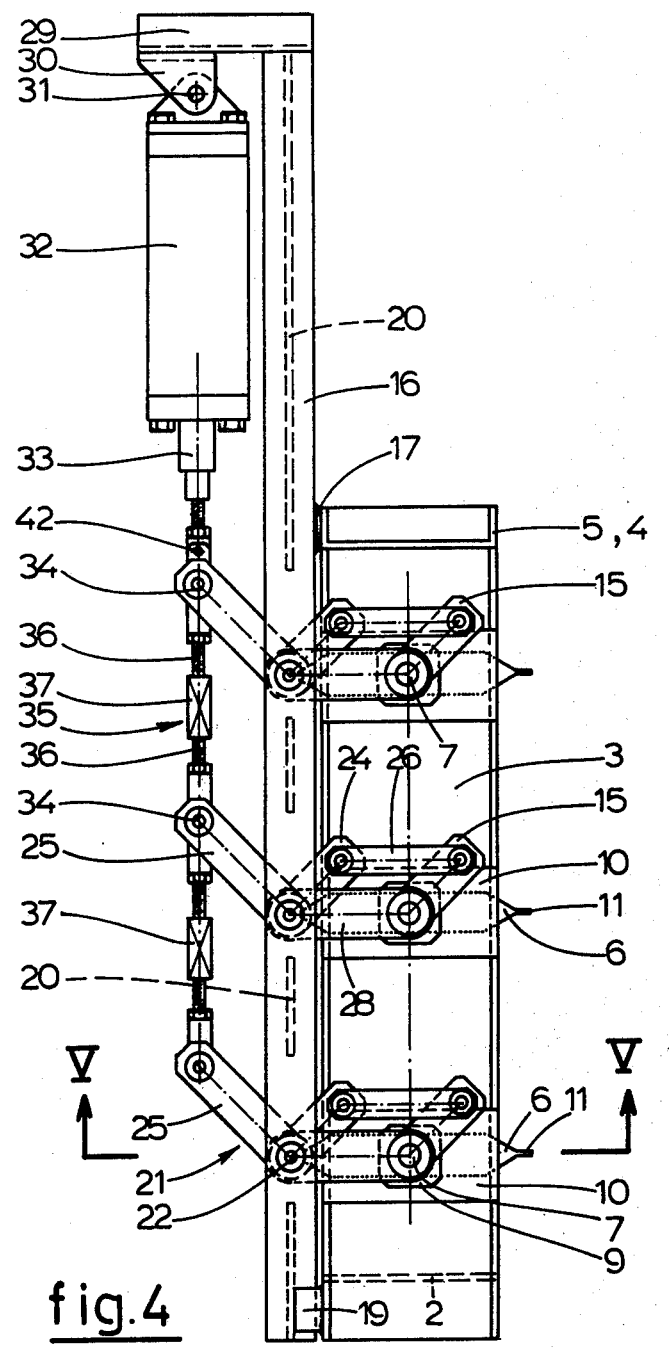
FIG. 4 shows a side elevation of the damper assembly of FIG. 3.
Figure 5:
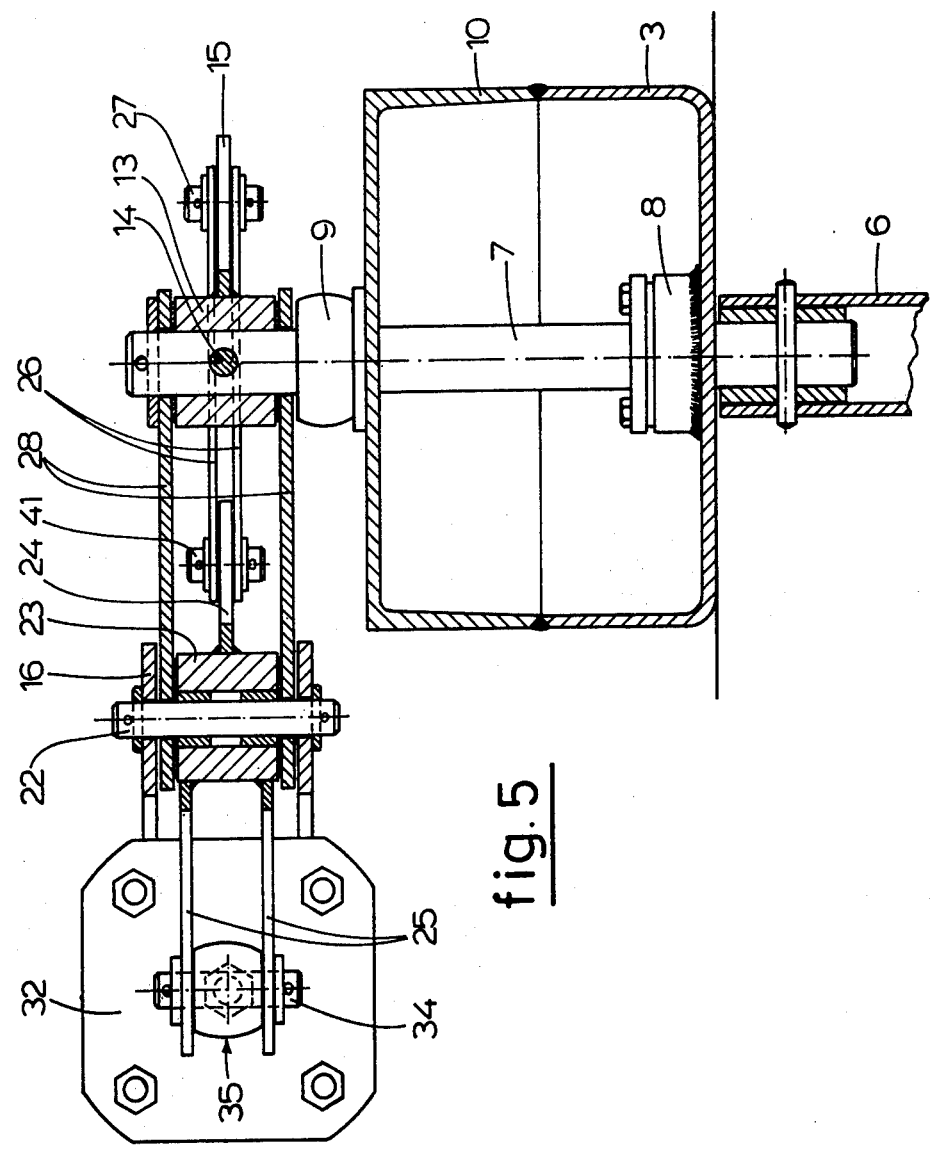
FIG. 5 is a sectional view taken substantially through FIG. 4 along the line V—V.

The damper assembly shown in FIGS. 3, 4 and 5 has a frame 1, which is adapted to be built into a duct (not illustrated) suitable for carrying hot gases, for instance, the exhaust gases of a gas turbine, and consists of channel sections welded together with their flanges facing outwards. The frame 1 comprises a lower frame member 2, to the ends of which are welded lateral members 3 (only one of which is visible), and an upper frame member 4 welded onto these lateral members and projecting on the side shown in FIG. 3 beyond the lateral frame member 3 to form a salient connecting part 5. A plurality of damper blades 6 are arranged in the frame 1 and are fixed on blade shafts 7. The shafts 7 are rotatably mounted in packing bushes 8 and journals 9, which are fixed to the lateral members 3 and on U-shaped supports 10, respectively, said supports being welded to these frame members 3 at the location of the blade shafts. The blades 6 have flat edge portions 11 at both sides which, in the closed position of the damper, contact each other or bear against sealing strips 12 secured to the bottom frame member 2 and the top frame member 4. The damper blades 6 are sealed at both ends against the lateral members 3 of the frame by means not shown which also under hot operating conditions of the damper retain their sealing function despite the differential expansion of the blades 6 and the damper frame 1. On the side of the frame 1 shown in FIG. 3 there is provided an actuating mechanism for the blades 6 comprising sleeves 13 secured to the outwardly projecting ends of the shafts 7 by means of a cross-pin 14 (FIG. 5) and having flat operating arms 15 rigidly secured thereto. The damper assembly described so far is of generally known construction. Although in the illustrated embodiment only three damper blades 6 are shown, it will be understood that the number of such blades can be larger according to the size of the duct to be closed.

The means for actuating the blades 6 comprise a support member in the form of an H cross-section beam 16, which is secured by the interposition of a spacer plate 17 to a side flange of the U-shaped connecting part 5, and extends laterally spaced from the lateral frame member 3 and parallel thereto, and also spaced from the plane passing through the blade shafts 7. The lower end of the support beam 16 is seated in a guide means consisting a rigid flat iron 18 welded to the side face of the lateral frame member 3, the flat iron having two guide members 19 which extend outwards and enclose the flanges of the support beam 16, but allow a longitudinal displacement of the bottom end of the support beam 16 relatively to the lateral frame member 3. The guide members 18 and 19 are so arranged as to allow a limited deflection of the bottom end of the support beam 16 in a directing normal to the plane of the frame and towards this plane.

The web 20 of the H-section support beam 16 is provided at the height of the blade shafts 7 with interruptions, in which ancillary bellcrank levers 21 are supported for free rotation on shafts 22 mounted on the flanges of the support beam 16. Each of the identical bellcranks 21 consist of a sleeve 23, rotatable on the corresponding shaft 22, which carries a flat-iron lever arm 24 and two further parallel flat iron arms 25 at right angles to the arm 24. Each arm 24 lies in the same plane as the corresponding blade arm 15 and is hingedly secured by a pin 41 to an operating link 26, formed by two parallel flat bars which link is, at its other end, hingedly connected by a pin 27 with the blade arm 15. In addition, each bellcrank shaft 22 is hingedly connected by a tie link consisting of two parallel flat bars 28 with the corresponding blade shaft 7, the bars 28 engaging the shafts 22 and 7 on both sides of the sleeves 23 and 13, respectively. The tie link 28 has the same length as the operating link 26, so that these two links together with the bellcrank lever arm 24 and the blade arm 15 form a parallelogram.

The support beam 16 extends upwardly past the upper frame member 4 and carries at its upper end a cross member 29, on which an air cylinder 32 is articulately suspended by means of lugs 30 and a pivot pin 31. A piston with a downwardly directed piston rod 33 is vertically reciprocatable in the cylinder 32, the air supply and discharge lines connected to the cylinder not being shown in the drawing. The bellcrank lever arms 25 are linked to a coupling rod 35 by means of hinge pins 24 and the upper end of the coupling rod 35 is hinged by a pin 42 to the piston rod 33. This coupling rod 35 comprises, in a known manner, separate rod portions each linked to a corresponding bellcrank lever arms 25, the rod portions having at their two ends threaded end parts 36 of oppositely directed pitch and being coupled to each other between adjacent lever arms 25 by threaded bushes 37 with oppositely directed threading at their two ends. By means of these threaded bushes 37 the bellcrank lever arms 25 can be accurately set parallel to each other, whereby also the bellcrank lever arms 24 and the blade arms 15 become parallel to each other. If, as is shown in FIG. 4, the blades 6 occupy an open position, the piston in the cylinder 32 is in its upper end position. By supplying compressed air to the cylinder space above the piston, the coupling rod 35 can be moved downwards whereby the bellcrank levers 21 are turned through 90 degrees, these levers entraining through the operating links 26 the blade arms 15 which turn the damper blades 6 into the closed position.

Figure 1:
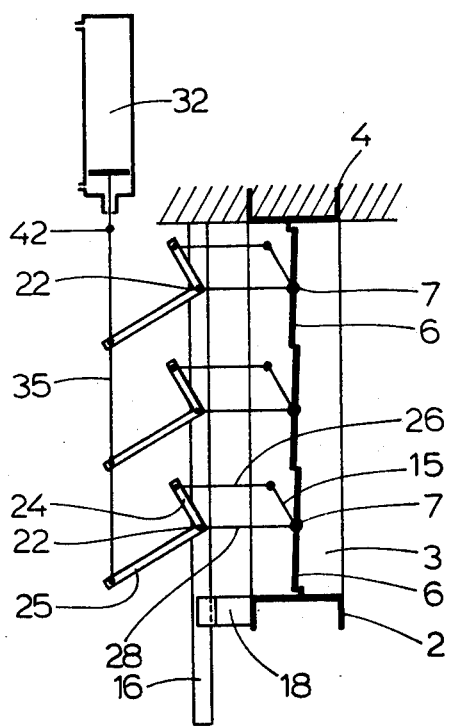
FIG. 1 is a schematic view showing the damper of the present invention, closed, and in the cold condition.
Figure 2:
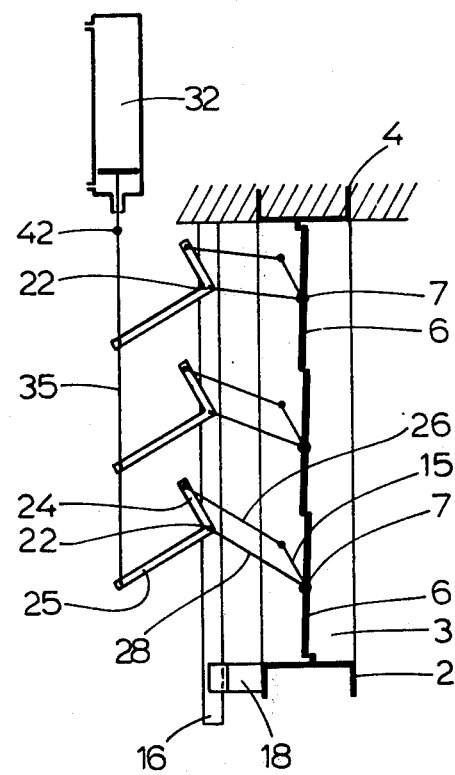
FIG. 2 is a schematic view showing the damper of the present invention in a warm condition, when the damper is closed.

The closed position is schematically illustrated in FIGS. 1 and 2, which use the same reference symbols as FIGS. 3, 4 and 5, FIG. 1 showing the damper frame under cold conditions, and FIG. 2, somewhat exaggerated, under warm conditions. Since the damper frame and the support beam 16 are firmly anchored or at least rigidly interconnected at their upper sides, the lateral members 3 of the frame will expand as a result of a temperature rise of the damper frame 1 by hot gases flowing through the duct into which the frame is built causing the lower frame member 2 to shift downwards in relation to the support beam 16, which itself remains comparatively cool. As a result, the blade shafts 7 will also be displaced downwards with respect to the shafts 22 of the bellcrank levers 24 and 25, this relative vertical shift increasing, as is shown in FIG. 2, the farther the blade shaft 7 lies from the fixedly anchored upper frame member 4. Owing to the parallelograms of links described above, which consists of the bellcrank lever arms 24, the blade operating arms 15, the operating links 26 and the tie links 28, the blade arms 15 retain their original angular position parallel to the bellcrank lever arms 24, which are unaffected by the thermal expansion of the damper frame, so that the blades 6 of the damper assembly maintain their closed position and no gaps can occur between them. Owing to the slight rotation of the tie rods 28 extending between the bellcrank shafts 22 and the blade shafts 7, the horizontal spacing of the bellcrank shafts 22 from the vertical plane passing through the blade shafts 7 is slightly shortened. The stresses arising because of this are taken up by the tie links 28, which thus flex the support beam 16 against its own resilient reaction and pull the beam progressively from its upper to its lower end towards the damper frame 1. This flexure is, however, very small, and amounts at the free end of the support beam 16 to some 1–2 mm, which can be readily absorbed by the previously described guide means 18 and 19.

It will be appreciated that also in the open position of the damper temperature fluctuations in the damper frame 1 will have no effect on the angular position of the blades 6.

The air cylinder 32 need not be suspended coaxially to the coupling bar 35 on the top side of the extended support beam 16, as described above. It is also possible, as indicated by interrupted lines in FIG. 3, to support the air cylinder 32' over a linking pivot 31' on a bracket 38, which is fixed laterally to the beam 16 and extends to a position adjacent to the coupling bar 35. In this case, the upwardly extending piston rod 33' is connected through a hinge coupling 39 to a cross pin 40, whose other side is connected, in a way not shown in FIG. 3, to the coupling bar 35, or preferably, directly to one of the bellcrank lever arms 25. In such an arrangement, the air cylinder 32' need not be coupled with the topmost bellcrank lever arm 25 but any of the lever arms 25 in a lower position may be chosen for this coupling instead. This presents the advantage that the air cylinder 32' can be mounted on the support beam 16 at any desired height as is most suitable in connection with the available space.

The foregoing described but one preferred embodiment of the present invention, other embodiments being possible without exceeding the scope of the present invention as defined in the following claims.

I claim:

1. A damper assembly for closing a supply duct suitable for carrying hot gases comprising a damper frame mounted in said supply duct, a plurality of damper blades, a plurality of parallel blade shafts rotatably mounted in said frame and supporting said damper blades, said shafts having shaft ends projecting from said frame at at least one side thereof, blade operating arms secured to the projecting blade shaft ends, and linkage means operatively coupling said blade arms to each other and to an actuating device for opening and closing the damper, characterized in that the linkage means include a plurality of identical ancillary lever means operatively associated with each of said blade arms respectively, and rotatably supported on lever shafts extending parallel to the blade shafts and mounted on a support member secured outside of said duct, said lever means each having a lever arm of a length equal to the length of the associated blade arm to which it is linked by an operating link, said link having a length such that at least under a given temperature condition of the damper frame said lever arm extends parallel to its associated blade arm, the ancillary lever means being connected to each other in parallel position and to the actuating device by a coupling rod.

2. A damper assembly according to claim 1, characterized in that a tie link extends between the lever shaft of each ancillary lever means and the associated blade shaft, the length of the tie link being equal to the length of the operating link, said support member being arranged to have a restricted freedom of movement at right angles to the plane of the frame.

3. A damper assembly according to claim 2, characterized in that the support member consists of a beam extending at right angles to the blade shafts and rigidly united to the frame in the extension of one of the two frame members lying parallel to the blade shafts and so seated in a guide means formed on the frame in the extension of the opposite frame member as to allow a translatory movement of the beam relatively to the frame and a restrictive flexure of the beam at right angles to the plane of said frame.

4. A damper assembly according to claim 1, characterized in that each ancillary lever means is a bellcrank lever comprising a second lever arm which forms an angle with said first-mentioned lever arm and which is articulated to the coupling rod.

5. A damper assembly according to claim 2, characterized in that each tie link consists of two parallel bars which at one end engage the associated lever shaft on both sides of the ancillary lever means thereof, and which at their other end engage the associated blade shaft on both sides of the blade arm thereon.

6. A damper assembly according to claim 3, characterized in that the actuating device for the coupling rod, such as an air cylinder, is mounted to the beam forming said support member.

7. A damper assembly according to claim 6, characterized in that the beam extends beyond the frame member to which it is firmly connected, the actuating device, such as the air cylinder, being suspended on the beam part projecting beyond the frame.

8. A damper assembly according to claim 6, characterized in that the actuating device, such as the air cylinder, is supported by the beam in a position laterally of said coupling rod and is coupled by a transverse connection to the coupling rod or to one of said ancillary lever means.

* * * * *